US012685969B2

(12) United States Patent
Wang et al.

(10) Patent No.: US 12,685,969 B2
(45) Date of Patent: Jul. 21, 2026

(54) METHOD FOR PREPARING A NOVEL GUANIDINE-BASED COMPOSITE NANOFILTRATION FLAT-SHEET MEMBRANE

(71) Applicant: TONGJI UNIVERSITY, Shanghai (CN)

(72) Inventors: Qiaoying Wang, Shanghai (CN); Tong Zhang, Shanghai (CN); Zhiwei Wang, Shanghai (CN); Hao Zhang, Shanghai (CN); Rong Huang, Shanghai (CN); Xianfeng Li, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 345 days.

(21) Appl. No.: 18/433,346

(22) Filed: Feb. 5, 2024

(65) Prior Publication Data

US 2024/0408552 A1     Dec. 12, 2024

(30) Foreign Application Priority Data

Jun. 9, 2023    (CN) ......................... 202310680054.6

(51) Int. Cl.
B01D 67/00 (2006.01)
B01D 61/02 (2006.01)
(Continued)

(52) U.S. Cl.
CPC ..... B01D 67/00933 (2022.08); B01D 61/027 (2013.01); B01D 67/009 (2013.01);
(Continued)

(58) Field of Classification Search
CPC ............ B01D 67/00933; B01D 61/027; B01D 67/009; B01D 67/0095; B01D 69/02;
(Continued)

(56) References Cited

U.S. PATENT DOCUMENTS

2022/0305436 A1*   9/2022  Ho ....................... B01D 53/228

FOREIGN PATENT DOCUMENTS

| CN | 215086205 U | 12/2021 |
| CN | 219072598 U | 5/2023 |
| CN | 116585904 A | 8/2023 |

* cited by examiner

*Primary Examiner* — Madeline Gonzalez
(74) *Attorney, Agent, or Firm* — Nitin Kaushik

(57)         ABSTRACT

The present invention belongs to the technical field of membrane-based water treatment and relates to a novel guanidine-based composite nanofiltration (NF) flat-sheet membrane, and a preparation method and application thereof. The present invention provides a method for preparing a guanidine-based composite NF flat-sheet membrane, where a dense separation layer is formed on the surface of a polyethersulfone ultrafiltration membrane through polymerization reaction between the amino group of 1,3-diaminoguanidine and the acyl chloride group of trimesoyl chloride. Under suitable reaction conditions, the guanidine-based composite NF membrane obtained according to the present invention enables effective separation of multivalent ions over a wide pH range, with a rejection rate of over 96% for 1000 ppm of $MgSO_4$ solution, and can operate continuously and stably in a mixed ions solution with a wide pH.

7 Claims, 3 Drawing Sheets

1,3-diaminoguanidine hydrochloride
↓ Immersion
PES ultrafiltration membrane (Adjusting pH of guanidine)

Interfacial polymerization
TMC
Guanidine-based composite nanofiltration membrane

(51) Int. Cl.

| | |
|---|---|
| *B01D 69/02* | (2006.01) |
| *B01D 69/06* | (2006.01) |
| *B01D 69/12* | (2006.01) |
| *B01D 71/58* | (2006.01) |
| *B01D 71/68* | (2006.01) |
| *C08J 7/04* | (2020.01) |

(52) U.S. Cl.
CPC ......... *B01D 67/0095* (2013.01); *B01D 69/02* (2013.01); *B01D 69/06* (2013.01); *B01D 69/1214* (2022.08); *B01D 69/1251* (2022.08); *B01D 71/58* (2013.01); *B01D 71/68* (2013.01); *C08J 7/0427* (2020.01); *B01D 2325/023* (2013.01); *C08J 2377/06* (2013.01); *C08J 2381/06* (2013.01)

(58) Field of Classification Search
CPC ............... B01D 69/06; B01D 69/1214; B01D 69/1251; B01D 71/58; B01D 71/68; B01D 2325/023; B01D 2323/48; B01D 2325/30; B01D 67/0006; B01D 71/56; B01D 71/82; B01D 71/06; C08J 7/0427; C08J 2377/06; C08J 2381/06; Y02A 20/131; C02F 1/442
USPC ..................................... 210/500.41, 650, 653
See application file for complete search history.

500 nm*    EHT = 3.00 kV    Mag = 20.00 K X    Signal A = SE2    WD = 6.6 mm

METHOD FOR PREPARING A NOVEL GUANIDINE-BASED COMPOSITE NANOFILTRATION FLAT-SHEET MEMBRANE

CROSS-REFERENCE TO RELATED APPLICATIONS

The application claims priority to Chinese patent application No. 2023106800546, filed on Jun. 9, 2023, the entire contents of which are incorporated herein by reference.

TECHNICAL FIELD

The present invention belongs to the technical field of membrane-based water treatment and relates to a novel guanidine-based composite nanofiltration flat-sheet membrane, and a preparation method and application thereof.

BACKGROUND

Nanofiltration (NF) is a membrane separation technology using pressure difference as a driving force, and the pore size of NF membrane is approximately 0.5-2.0 nm. The surface or interior of NF membrane contains charged groups, and the Donnan effect enables the NF membrane to separate charged particles and have a high rejection rate in particular for multivalent ions.

Due to electrostatic interaction, the rejection rate of multivalent ions by NF membrane decreases with increasing pH, and the separation efficiency is limited under alkaline condition. In recent years, many studies have introduced amino or imidazole groups into NF membranes to enhance the rejection of divalent ions such as $Mg^{2+}$ by protonation. However, such functional groups have relatively low acid dissociation constants (pKa<10), making it difficult to fully protonate under alkaline condition. Guanidine group has the highest pKa value of 13.8, allowing it to maintain protonation over a wide range of pH values. There is no reported patent that increases the pKa value of a membrane by introducing the guanidine group so as to enable the membrane to operate over a wide pH range. The existing patents that introduce the guanidine group into membranes primarily focus on antimicrobial and antifouling properties of membranes. For instance, Chinese patent CN113509849A discloses a composite modified membrane based on aminated graphene oxide, polydopamine, and a guanidine-based antibacterial agent, and a preparation method and application thereof. However, the existing patents involve cumbersome operational steps and there is no NF membrane special for rejecting multivalent ions over a wide pH range. 1, 3-diaminoguanidine hydrochloride contains abundant guanidine and amino groups, and by directly introducing the guanidine group onto the membrane surfaces, the positive charge of membrane surface can be enhanced under alkaline condition, thereby achieving effective rejection of positively charged multivalent ions such as $Mg^{2+}$ over a wide pH range.

SUMMARY

The objective of the present invention is to provide a method for forming a dense separation layer by introducing abundant guanidine group, so as to prepare a composite NF membrane that efficiently rejects multivalent ions such as $Mg^{2+}$ over a wide pH range.

To achieve the objective, the study made in the present invention shows that 1, 3-diaminoguanidine hydrochloride contains abundant guanidine and amino groups, and by directly introducing the guanidine group onto the membrane surface, the positive charge of membrane surface can be enhanced under alkaline condition, thereby achieving effective rejection of positively charged multivalent ions such as $Mg^{2+}$ over a wide pH range.

The present invention provides a method for preparing guanidine-based composite NF flat-sheet membrane, comprising the following steps:

1) pretreatment of PES ultrafiltration membrane: a wet PES membrane is sonicated and then soaked in deionized water for at least 12 hours, and visible moisture on the surface is removed by using a rubber roller;

2) preparation of reaction solutions: an aqueous phase solution is prepared by using 2-2.5 wt % of 1,3-diaminoguanidine hydrochloride, and an oil phase solution is prepared by using 0.1-0.3 wt % of trimesoyl chloride; and 3) preparation of a guanidine-based composite NF membrane: the aqueous phase solution obtained in step 2), i.e., the 1,3-diaminoguanidine hydrochloride solution, is placed on the surface of said PES ultrafiltration membrane obtained in step 1) and shaken well, the solution pH is promptly adjusted to 11.2-11.5, after 1 minute, the solution is poured out and visible moisture on the membrane surface is wiped, the oil phase solution obtained in step 2) is added, after reacting for 1-2 minutes, the oil phase solution is poured out, and the membrane is placed in an oven for drying; "promptly" refers to adjusting the pH immediately, within such as 10 seconds, preferably within 5 seconds; and the membrane is cooled down at room temperature, then the surface of guanidine-based composite NF membrane is rinsed with deionized water, and thus the guanidine-based composite NF flat-sheet membrane is obtained.

Preferably, in said step 1), the wet PES membrane is a PES membrane soaked in a sodium bisulfite solution.

Preferably, in said step 1), the rubber roller rolls by 1-2 times.

Preferably, in said step 2), the aqueous phase solution is a guanidine salt aqueous solution, which is prepared and used immediately.

Preferably, in said step 2), n-hexane is used as a solvent for the oil phase solution.

Preferably, in said step 3), a 10 wt % of NaOH solution is used to adjust the pH.

Preferably, in said step 3), the room temperature is 20° C.

Preferably, in said step 3), TMC is sonicated for 1-3 minutes before being used, and the water temperature for sonicating is kept constant at 20° C., fluctuating no more than 1° C.

Preferably, in said step 3), the process of pouring out the aqueous phase solution, wiping the visible moisture on the membrane surface and then adding TMC is controlled within 1 minute.

Correspondingly, the present invention provides a guanidine-based composite NF flat-sheet membrane, where a separation layer is formed by polymerization on the surface of PES ultrafiltration membrane, and the separation layer is a dense separation layer of the NF membrane prepared by interfacial polymerization between the amino group of 1, 3-diaminoguanidine and the acyl chloride group of trimesoyl chloride.

According to the present invention, an interfacial polymerization reaction between the amino group of 1, 3-diaminoguanidine and the acyl chloride group of TMC introduces the guanidine group into the separation layer of polyamide NF membrane, thereby effectively enhancing protonation on the membrane surface.

The guanidine-based composite NF flat-sheet membrane described in the present invention is used for efficiently reject divalent and high valent ions such as $MgSO_4$. The guanidine-based composite NF membrane prepared according to the present invention has a rejection rate of over 96% for a 1000 ppm of $MgSO_4$ solution, and a rejection rate of only 42% for monovalent ions such as a 1000 ppm of NaCl solution, and the membrane can operate continuously and stably in a mixed solution of alkaline ions with a pH of 8-9.

Specifically, the method for preparing the novel guanidine-based composite NF flat-sheet membrane of the present invention comprises the following steps:

1) pretreatment of polyethersulfone (PES) ultrafiltration membrane: a membrane is sonicated for a few minutes and then soaked in continuously updated deionized water for at least 12 hours, rolled by a rubber roller to remove visible moisture on the surface, and placed in a self-made reaction device (the size of which may be selected as needed, for example, the device is a square frame with an inner size of 6×6 cm);

2) preparation of reaction solutions: an aqueous phase solution is prepared by using 2-2.5 wt % of 1,3-diaminoguanidine hydrochloride, and an oil phase solution is prepared by using 0.2 wt % of trimesoyl chloride (TMC); and 3) preparation of a guanidine-based composite NF membrane: 10 mL of the guanidine salt aqueous solution obtained in step 2) is placed on the surface of said PES membrane obtained in step 1) and shaken well, the solution pH is adjusted to 11.2-11.5 within 5 seconds, after 1 minute, the solution is poured out and visible moisture on the membrane surface is wiped, 5-10 mL of the TMC solution is added, after reacting for 1-2 minutes, the solution is poured out, and the membrane is placed in an oven at 60° C. for 5 minutes. The membrane is cooled down at room temperature, then the membrane surface is rinsed with deionized water, and thus the guanidine-based composite NF membrane is obtained.

The beneficial effects of the present invention are as follows:

1. The present invention uses 1,3-diaminoguanidine hydrochloride, which has a significant price advantage as compared to other polyamino monomers, thereby reducing preparation costs.

2. The present invention introduces the guanidine group having extremely high pKa, and thus the membrane can operate over a wide pH range. The prepared guanidine-based composite NF membrane has a rejection rate of over 96% for a 1000 ppm of $MgSO_4$ solution.

BRIEF DESCRIPTION OF DRAWINGS

To describe the technical solutions of the present application more clearly, a brief description will be given below to the accompanying drawings used in the embodiments. Apparently, all of the accompanying drawings in the following description are specific to some embodiments of the present application, and those of ordinary skill in the art may further derive other accompanying drawings from these accompanying drawings without creative effort.

DETAILED DESCRIPTION OF THE EMBODIMENTS

The present invention provides a method for preparing a novel guanidine-based composite NF flat-sheet membrane, where a dense separation layer is formed on the surface of a polyethersulfone ultrafiltration membrane through polymerization reaction between the amino group of 1,3-diaminoguanidine and the acyl chloride group of trimesoyl chloride. Under optimal reaction conditions, the hydrolysis of the guanidine group is reduced, and a significant amount of guanidine-based polymer can be retained on the membrane surface. The guanidine group, having a property of extremely high pKa, enables the guanidine-based composite NF membrane to effectively separate multivalent ions over a wide pH range. The advantages of the present invention are as follows: few preparation steps are needed; operation is simple; the cost is low; and the polymer composite NF membrane prepared according to the present invention can operate continuously with a strong stability over a wide pH range.

An explicit and complete description of the technical solution will be given below through the embodiments of present application. Apparently, the described embodiments are only some but not all preferred embodiments of the present application.

All other embodiments conceived by those of ordinary skill in the art based on the embodiments in the present application without creative effort fall within the scope of protection of the present application.

EMBODIMENT

Figure 1:
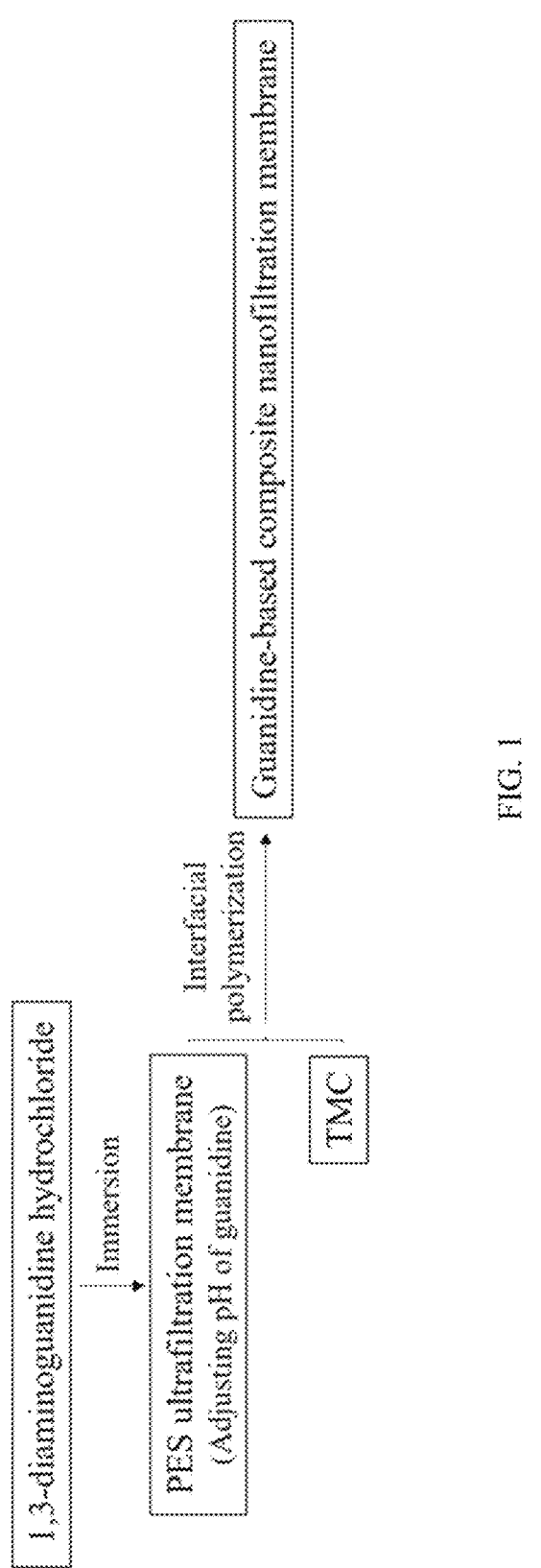
FIG. 1 shows a preparation flowchart of a method for preparing a novel guanidine-based composite NF flat-sheet membrane proposed in the present invention.
Figure 2:
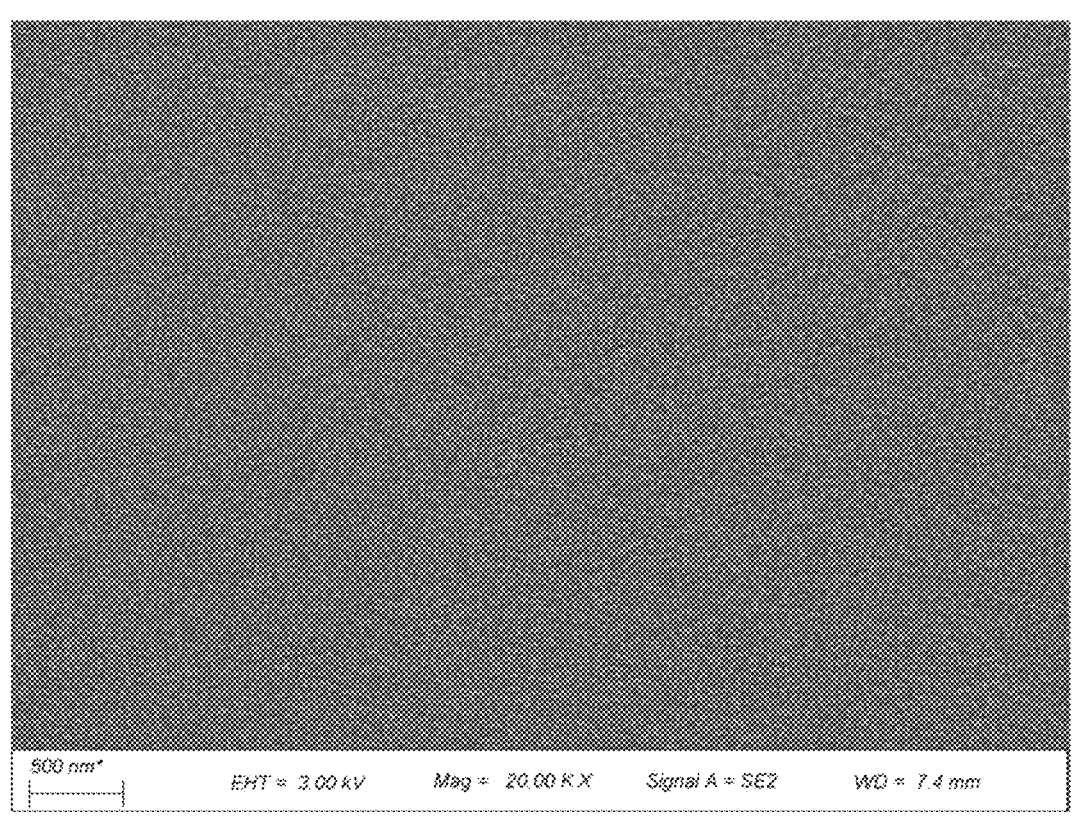
FIG. 2 shows an SEM image of a commercial PES membrane at 20,000 times of magnification of a scanning electron microscope.
Figure 3:
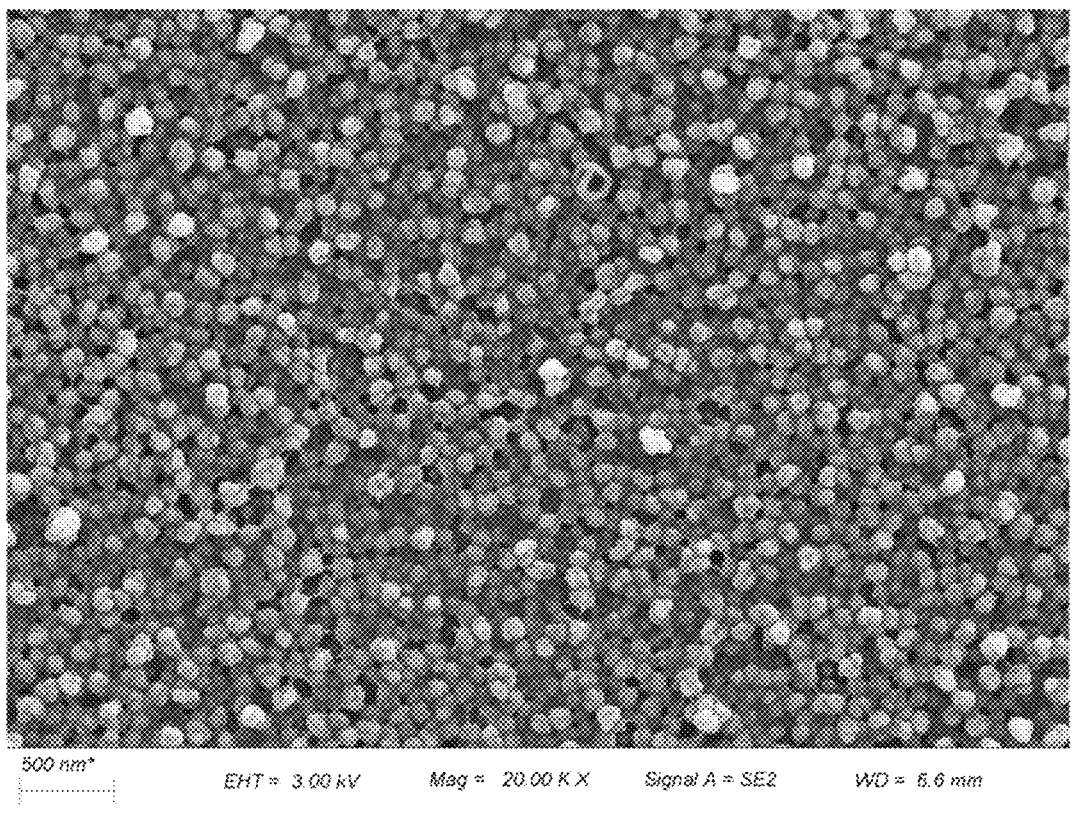
FIG. 3 shows an SEM image of a guanidine-based composite NF membrane of the present invention at 20,000 times of magnification of a scanning electron microscope.

As shown in FIG. 1, the present invention discloses a method for preparing a novel guanidine-based composite NF flat-sheet membrane, comprising the following steps: 1) Pretreatment of PES ultrafiltration membrane; 2) preparation of reaction solutions; and 3) preparation of a guanidine-based composite NF membrane.

During the pretreatment of PES ultrafiltration membrane, a wet PES membrane is sonicated for a few minutes and then soaked in continuously updated deionized water for at least 12 hours, rolled by a rubber roller for 1-2 times to remove visible moisture on the surface, and placed in a self-made reaction device to be fixed. Preferably, the PES ultrafiltration membrane is a wet membrane soaked in a 1 wt % of sodium bisulfite solution. The molecular weight rejection of the ultrafiltration membrane is 100 kDa. The effective reaction area of the membrane is 36 $cm^2$.

During the preparation of the reaction solutions, an aqueous phase solution is prepared by using 2-2.5 wt % of 1,3-diaminoguanidine hydrochloride, and an oil phase solution is prepared by using 0.1-0.3 wt % of trimesoyl chloride (TMC) to be ultrasonically dissolved in n-hexane. The guanidine salt aqueous solution is prepared and used immediately.

During the preparation of the guanidine-based composite NF membrane, 10 mL of the obtained aqueous phase solution is placed on the surface of the pretreated PES ultrafiltration membrane and shaken well, the solution pH is promptly adjusted to 11.2-11.5 within 5 seconds by using 10 wt % of NaOH, after 1 minute, the solution is poured out and visible moisture on the membrane surface is wiped, 5-10 mL of the sonicated TMC solution is added rapidly and uniformly, and after reacting for 1-2 minutes, the solution is poured out. The process of pouring out the aqueous phase solution, wiping the visible moisture on the membrane surface and then adding TMC rapidly and uniformly is preferably controlled within 1 minute. The membrane is placed in an oven at 60° C. for 5 minutes. The membrane is cooled down at room temperature, then the membrane surface is rinsed with deionized water, and thus the guanidine-based composite NF membrane is obtained.

The main objective of this embodiment is to prepare a dense NF membrane that can operate over a wide pH range by interfacial polymerization between low-cost guanidine salt with high pKa and TMC. The amino group of the guanidine reacts with the acyl chloride group of the TMC to form a dense separation layer of the NF membrane. The introduced guanidine group can maintain to be protonated under alkaline condition, therefore the guanidine-based composite NF membrane can effectively separate multivalent ions over a wide pH range.

This embodiment uses a customized cross-flow filtration device with effective filtration area of 6.25 cm$^2$, a cross-flow velocity of 0.6 L/min, and an operating pressure of 0.6 MPa, to test the performance of the membrane.

In this embodiment, the rejection performance of the membrane is evaluated by using 1000 ppm of MgSO$_4$, MgCl$_2$, LiCl, and NaCl respectively. The membrane according to the present invention can operate over a wide pH range. The prepared guanidine-based composite NF membrane has a rejection rate of over 96% for 1000 ppm of MgSO$_4$ solution.

Contrast Example

The rejection performance of the guanidine-based composite NF membrane prepared in the embodiment is compared with that of a piperazine amide NF membrane prepared in contrast example 1 by using the same method. The results are shown in Table 1.

TABLE 1 comparison between a guanidine-based composite NF membrane and a piperazine amide NF membrane prepared by using the same method

|  | Embodiment | Contrast Example 1 |
|---|---|---|
| Water flux (L/m$^2$ · h · bar) | 8.16-8.44 | 7.45-7.82 |
| MgSO$_4$(%) | 96.26-96.47 | 95.28-95.91 |
| MgCl$_2$(%) | 80.18-85.67 | 60.53-66.10 |
| LiCl(%) | 45.82-49.83 | 28.95-31.60 |
| NaCl(%) | 42.46-45.29 | 31.69-35.19 |

It can be seen from the test results in Table 1 that the guanidine-based composite NF membrane in the embodiment has a higher rejection rate as compared to the piperazine amide NF membrane (contrast example 1) prepared by using the same method, and has a rejection rate of over 96% for MgSO$_4$.

According to the present invention, a dense separation layer of the NF membrane is prepared on the surface of the PES ultrafiltration membrane by interfacial polymerization between the amino group of 1,3-diaminoguanidine and the acyl chloride group of TMC, with a rejection rate of over 96% for 1000 of ppm MgSO$_4$. In addition, introducing of the guanidine group enhances protonation on the membrane surface, and thus the membrane can operate stably for a long time in a mixed solution of ions with pH 8-9, achieving ion separation under alkaline condition.

The foregoing embodiments are only specific implementations of the present application, but the scope of protection of the present application is not limited thereto. Any changes or substitutions that can be conceived by those skilled in the art without creative efforts within the technical scope disclosed in the present application shall fall within the scope of protection of the present application. Therefore, the scope of protection of the present application shall be subject to the scope of protection of the claims in present application.

What is claimed is:

1. A method for preparing a guanidine-based composite nanofiltration (NF) flat-sheet membrane, comprising the following steps:

1) pretreatment of a polyethersulfone (PES) ultrafiltration membrane: a wet PES membrane is sonicated and then soaked in deionized water for at least 12 hours, and visible moisture on the surface is removed by using a rubber roller;

2) preparation of reaction solutions: an aqueous phase solution is prepared by using 2-2.5 wt % of 1,3-diaminoguanidine hydrochloride, and an oil phase solution is prepared by using 0.1-0.3 wt % of trimesoyl chloride; and 3) preparation of a guanidine-based composite NF membrane: the aqueous phase solution obtained in step 2) is placed on the surface of said PES ultrafiltration membrane obtained in step 1) and shaken well, the solution pH is promptly adjusted to 11.2-11.5, after 1 minute, the solution is poured out and visible moisture on the membrane surface is wiped, the oil phase solution obtained in step 2) is added rapidly and uniformly, after reacting for 1-2 minutes, the oil phase solution is poured out, the membrane is placed in an oven for drying, the membrane is cooled down at room temperature, then the surface of the guanidine-based composite NF membrane is rinsed with deionized water, and thus the guanidine-based composite NF flat-sheet membrane is obtained.

2. The method for preparing the guanidine-based composite NF flat-sheet membrane according to claim 1, wherein in said step 1), PES membrane is a wet membrane soaked in sodium bisulfite solution.

3. The method for preparing the guanidine-based composite NF flat-sheet membrane according to claim 1, wherein in said step 2), the aqueous phase solution is prepared and used immediately, and n-hexane is used as a solvent for the oil phase solution.

4. The method for preparing the guanidine-based composite NF flat-sheet membrane according to claim 1, wherein in said step 3), a 10 wt % of NaOH solution is used to adjust the pH.

5. The method for preparing the guanidine-based composite NF flat-sheet membrane according to claim 1, wherein in said step 3), the room temperature is 20° C.

6. The method for preparing the guanidine-based composite NF flat-sheet membrane according to claim 1, wherein in said step 3), the trimesoyl chloride solution is sonicated for 1-3 minutes before being used, and the water temperature for sonicating is kept constant at 20° C.

7. The method for preparing the guanidine-based composite NF flat-sheet membrane according to claim 1, wherein in said step 3), the process of pouring out the aqueous phase solution, wiping the visible moisture on the membrane surface and then adding trimesoyl chloride rapidly and uniformly is controlled within 1 minute.

\* \* \* \* \*